Patented Nov. 14, 1922.

1,435,506

UNITED STATES PATENT OFFICE.

ARCHIBALD SCOTT, OF HUMBOLDT, ARIZONA, ASSIGNOR TO WESTERN METALLURGICAL COMPANY, OF HUMBOLDT, ARIZONA, A CORPORATION OF DELAWARE.

PROCESS FOR RECOVERY OF METALLIC VALUES FROM FUME PRECIPITATE.

No Drawing.    Application filed November 4, 1919. Serial No. 335,753.

*To all whom it may concern:*

Be it known that I, ARCHIBALD SCOTT, a citizen of the United States, residing at Humboldt, in the county of Yavapai and State of Arizona, have invented certain new and useful Improvements in Processes for Recovery of Metallic Values from Fume Precipitate, of which the following is a specification.

This invention relates to the recovery of metallic values from fume precipitate obtained by collection by the so-called Cottrell process, or otherwise, from fume containing volatilized chlorides of various metals, such fume being produced by subjecting the ores of such metals to heat in the presence of a chloridizing agent. Such fume precipitate is neither mechanically nor metallurgically in proper form to be susceptible of further treatment by any established practice or method without great loss of values and disproportionately heavy expense, therefore, The main object of the present invention is to provide for the treatment of the fume precipitate in such manner as to recover substantially all of the valuable metals contained therein at a low cost and in a product that can subsequently be treated by established metalluragical practice to convert the metals into products valuable in the arts and industries.

The material to which my process particularly applies is the finely divided precipitate composed essentially of solid particles of chloride and oxychloride of various metals, as for example, gold, silver, copper, lead, zinc, nickel, etc., also certain impurities transferred mechanically from the raw material treated. Such a precipitate is in practice usually obtained by the application of the so-called Cottrell process for electrostatic precipitation of fumes containing the volatilized chlorides of the metals mentioned, or other metals. Such precipitate may also be obtained by other methods, as for example, bag houses, scrubbers, etc., and, therefore, it is not my intention to limit my invention to the Cottrell precipitate only, nor to the treatment of the metals mentioned above. The precipitate may be moistened, if desired, or mixed with oil, or other substance, to put it in suitable form for transportation or furnace treatment and to prevent excessive dust loss.

I find that certain precipitates contain sulphur in such quantity as to make it inadvisable to treat them by the method described in my application of even date, the quantity of sulfur present being sufficient to interfere with complete reduction of the metal to metallic form, but insufficient to form a matte with the metal present. With precipitates of this character, the first step in my present process consists in adding sufficient sulphur or sulphurous material to form a matte with the valuable metals contained in the ores. I then mix the precipitate with a sufficient quantity of calcium oxide, or calcium carbonate, to satisfy the chlorine in the precipitate, and to form a calcium chloride slag upon fusion of the mixture. In place of calcium oxide or carbonate there may be substituted sodium carbonate or bicarbonate, or potassium carbonate in treatment, with similar result, or generally any basic reagent, or reagent containing a base capable of reacting with the metallic chlorides in the precipitate to form a chloride of such base may be used.

The mixed charge is then fed into a suitable furnace and heated in a reducing atmosphere until the non-metallic elements are combined with the calcium or other base and slagged off, and the metallic element or elements are reduced to matte.

The matte is then treated in a Bessemer converter, or other similar apparatus, to desulphurize same and produce a bullion in the usual manner.

The chemical reactions involved in my process are as follows:

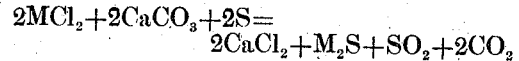

$$2MCl_2 + 2CaCO_3 + 2S = 2CaCl_2 + M_2S + SO_2 + 2CO_2$$

What I claim is:

The process of treating fume precipitate containing metallic chlorides and also containing sulphur in sufficient quantity to produce a matte with the valuable metallic content of the precipitate, which consists in adding thereto sufficient sulphur to produce a matte, with the valuable metals contained in the precipitate and a basic reagent capable of combining with the chlorine of the precipitate and heating the mixture to form a matte containing such metals and a slag containing the chloride of such basic reagent.

In testimony whereof I have hereunto subscribed my name.

ARCHIBALD SCOTT.